United States Patent
Choi et al.

(10) Patent No.: US 11,845,535 B2
(45) Date of Patent: Dec. 19, 2023

(54) PROPELLER APPARATUS OF AIR MOBILITY

(71) Applicants: Hyundai Motor Company, Seoul (KR); Kia Corporation, Seoul (KR)

(72) Inventors: Jae Young Choi, Seongnam-si (KR); Sang Hyun Jung, Hwaseong-si (KR); Chung Sik Yim, Anyang-si (KR); Kyu Hoon Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 195 days.

(21) Appl. No.: 17/459,772

(22) Filed: Aug. 27, 2021

(65) Prior Publication Data

US 2022/0185450 A1    Jun. 16, 2022

(30) Foreign Application Priority Data

Dec. 15, 2020    (KR) .................. 10-2020-0175428

(51) Int. Cl.
*B64C 11/28*    (2006.01)

(52) U.S. Cl.
CPC .................... *B64C 11/28* (2013.01)

(58) Field of Classification Search
None
See application file for complete search history.

(56) References Cited

U.S. PATENT DOCUMENTS

| | | | |
|---|---|---|---|
| 2,658,576 A | 11/1953 | Mosinskis | |
| 3,254,725 A | 6/1966 | Higgins | |
| 3,404,852 A * | 10/1968 | Sambell | B64C 29/0033 416/142 |
| 5,628,620 A * | 5/1997 | Arlton | A63H 27/12 446/40 |
| 2006/0285976 A1* | 12/2006 | Jalaguier | B64C 27/39 416/134 A |
| 2015/0274290 A1 | 10/2015 | Fenny et al. | |
| 2016/0152329 A1* | 6/2016 | Tzeng | B64C 11/28 29/889.1 |
| 2019/0016441 A1 | 1/2019 | Schank et al. | |
| 2019/0055003 A1 | 2/2019 | Luo et al. | |
| 2019/0210718 A1 | 7/2019 | Wang | |
| 2019/0382106 A1 | 12/2019 | Prager | |
| 2019/0389569 A1 | 12/2019 | Paulson et al. | |

FOREIGN PATENT DOCUMENTS

| CN | 207658045 | 7/2018 |
|---|---|---|
| KR | 10-2020-0104582 A | 9/2020 |

* cited by examiner

*Primary Examiner* — Kayla Mccaffrey
(74) *Attorney, Agent, or Firm* — MORGAN, LEWIS & BOCKIUS LLP (57) ABSTRACT

A propeller apparatus of an air mobility may include blades configured for being folded or unfolded in a response to flight situation of the air mobility, so that energy efficiency of the air mobility is improved and flight distance is increased by efficient use of the plurality of blades in each flight situation. Furthermore, as a pitching motion of the plurality of blades is performed in addition to a folding or unfolding motion of the plurality of blades, flight performance is improved.

16 Claims, 6 Drawing Sheets

PROPELLER APPARATUS OF AIR MOBILITY

CROSS REFERENCE TO RELATED APPLICATION

The present application claims priority to Korean Patent Application No. 10-2020-0175428, filed Dec. 15, 2020, the entire contents of which is incorporated herein for all purposes by this reference.

BACKGROUND OF THE INVENTION

Field of the Invention

The present invention relates to a propeller apparatus of an air mobility, and more particularly, to a propeller apparatus of an air mobility having blades that are folded or unfolded in a response to flight situation.

Description of Related Art

Recently, an air mobility configured for using in various fields such as a cargo container and medical transportation has been developed, and energy efficiency and stabilization of air mobility have been developed and are reaching the stage of practical use.

The air mobility may fly by operation of a propeller, which enables vertical takeoff and landing. However, vertical takeoff and landing of the air mobility require greater thrust and use of more propellers than during cruising. When air mobility enters a cruising mode, the air mobility may cruise by the lift of the wings, and does not require operation of some propellers used during vertical takeoff and landing. When the air mobility enters a high speed cruising mode, the propeller generates air resistance, causing energy loss during cruising.

Accordingly, a technique for selectively folding or unfolding the propeller in a response to flight situation of the air mobility is required for the air mobility.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a propeller apparatus of an air mobility. The propeller apparatus includes blades folded or unfolded in a response to flight situation of the air mobility to realize efficient use of the plurality of blades for each flight situation of the air mobility, so that energy efficiency of the air mobility is improved and flight distance is increased.

In various aspects of the present invention, there is provided a propeller apparatus of an air mobility. The propeller apparatus includes: a main rotor and a plurality of blades rotatably connected to the main rotor; a rotation shaft fixedly connected to the main rotor and configured to transmit a rotational force of the rotation shaft to the main rotor to rotate the main rotor and the plurality of blades; a first movable portion and a second movable portion that are slidably coupled to the rotation shaft and configured to independently perform vertical motion around the rotation shaft; a first link assembly coupling the first movable portion to the plurality of blades so that, during the vertical motion of the first movable portion, the plurality of blades may be rotated to perform a pitching motion of the plurality of blades; and a second link assembly coupling the second movable portion to the plurality of blades so that, during the vertical motion of the second movable portion, the plurality of blades may be rotated and moved to perform a folding or unfolding motion of the plurality of blades.

Each of the plurality of blades may be rotatably connected to the main rotor through a connecting portion, wherein the first link assembly and the second link assembly may be rotatably connected to the connecting portion at different locations.

The connecting portion may be coupled to each of the plurality of blades and be provided to be rotatable about a vertical shaft of the main rotor.

The first link assembly may include: a first connecting link rotatably connected to the first movable portion; a second connecting link coupled to a corresponding blade among the plurality of blades and rotatably connected to the connecting portion; and a third connecting link rotatably connected to the first connecting link and the second connecting link.

The first connecting link may be provided to be rotatable about a vertical shaft thereof, the second connecting link may be connected to the connecting portion to be rotatable about a horizontal shaft thereof, and the third connecting link may be connected to the first connecting link and the second connecting link to be rotatable about a horizontal shaft thereof.

The first movable portion may be moved vertically, the first connecting link and the third connecting link may be moved vertically together with the first movable portion to rotate the second connecting link, so that the corresponding blade connected to the second connecting link may be rotated on the connecting portion, changing pitch of the blade may be changed.

The second link assembly may include: a fixed link fixedly provided on the rotation shaft; a first rotating link rotatably connected to the connecting portion; a second rotating link rotatably connected to the second movable portion and the first rotating link; and a third rotating link rotatably connected to the fixed link and the second rotating link.

The first rotating link may include: a first additional link connected to the connecting portion to be rotatable about a vertical shaft thereof; and a second additional link connected at a first end portion thereof to the first additional link to be rotatable about a vertical shaft thereof and connected at a second end portion thereof to the second rotating link to be rotatable about a horizontal shaft thereof.

The fixed link may be located above the second movable portion and the second movable portion may be configured to be moved vertically at a location below the fixed link.

The second rotating link may extend longer than the third rotating link.

When the second movable portion is moved vertically and the second rotating link is rotated to be folded or unfolded to the rotation shaft while being supported by the third rotating link, the connecting portion connected to the main rotor may be rotated and a location of the blade may be changed.

The first movable portion may include an auxiliary rotor formed in the same shape as the main rotor, wherein the first link assembly may be connected to the main rotor and the auxiliary rotor.

The second movable portion may include an upper slider and a lower slider moving vertically together around the rotation shaft, wherein the upper slider and the lower slider may be spaced from each other at an upper side and a lower side of the first movable portion, and the upper slider and the lower slider may be connected to each other by a connecting shaft slidably passing through the first movable portion.

The second link assembly may be rotatably connected to the upper slider and the plurality of blades.

Any one of the plurality of blades may be connected to the first movable portion through the first link assembly, and the rest of the plurality of blades may be connected to the first movable portion and the second movable portion through the first link assembly and the second link assembly.

The propeller apparatus of the air mobility having the structure described above controls the plurality of blades thereof to be unfolded or folded in a response to flight situation of the air mobility. Accordingly, energy efficiency of the air mobility may be improved and flight distance may be increased by efficient use of the plurality of blades in each flight situation. Furthermore, as a pitching motion of the plurality of blades is performed in addition to a folding or unfolding motion of the plurality of blades, flight performance may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, a propeller apparatus of an air mobility according to various exemplary embodiments of the present invention will be described with reference to accompanying drawings.

Figure 1:
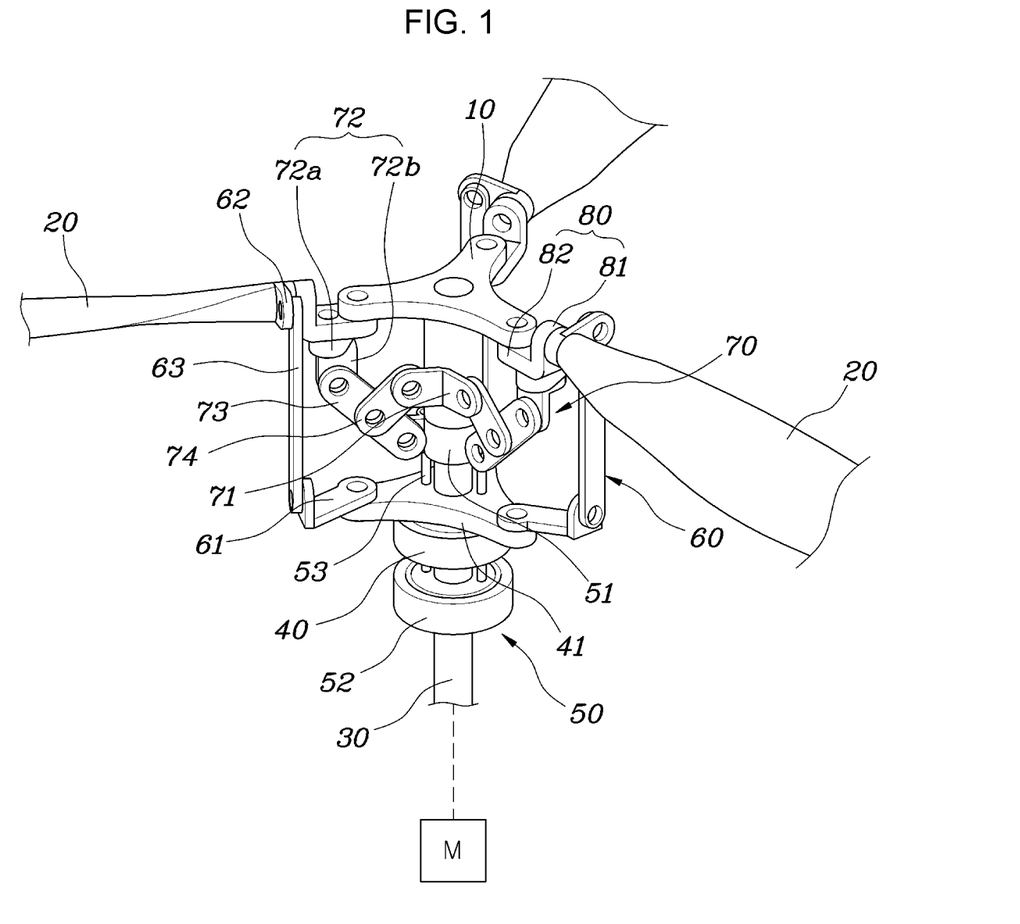
FIG. 1 is a view showing a propeller apparatus of an air mobility according to various exemplary embodiments of the present invention.
Figure 2:
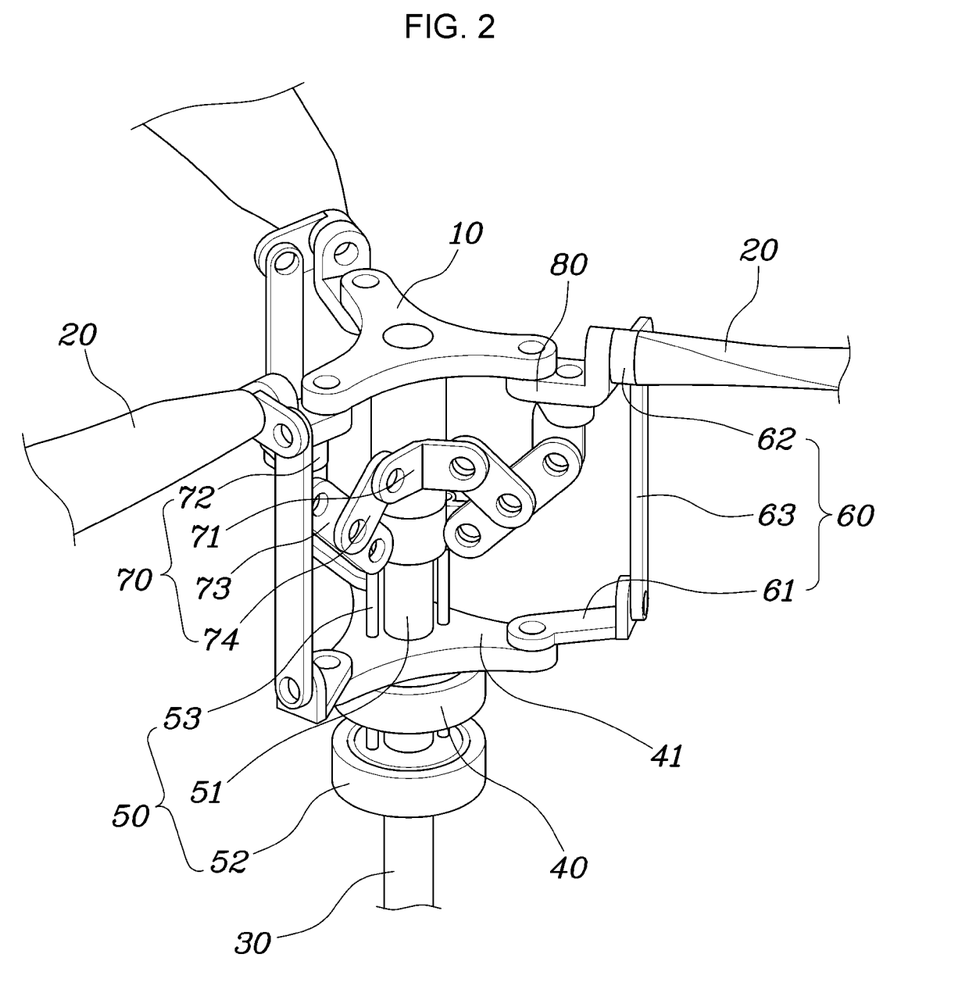
FIG. 2 is a view showing the propeller apparatus of the air mobility shown in FIG. 1.
Figure 3:
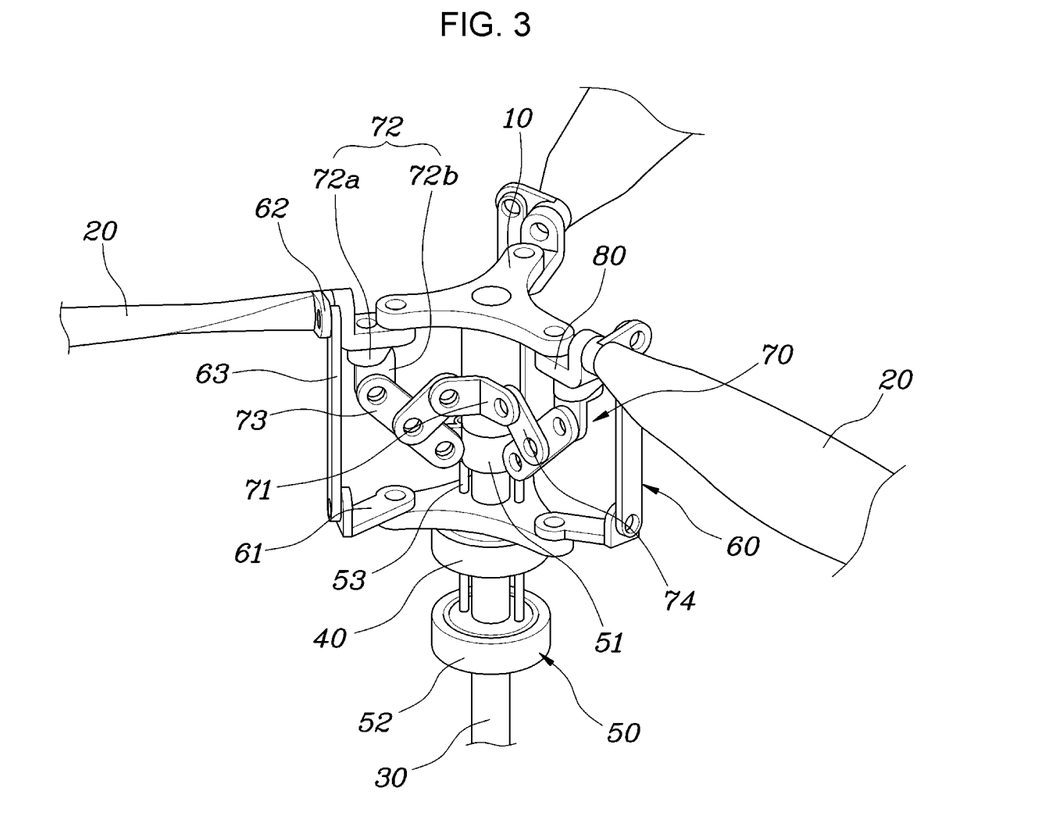
FIG. 3 and FIG. 4 are views showing a pitching motion of wings.
Figure 4:
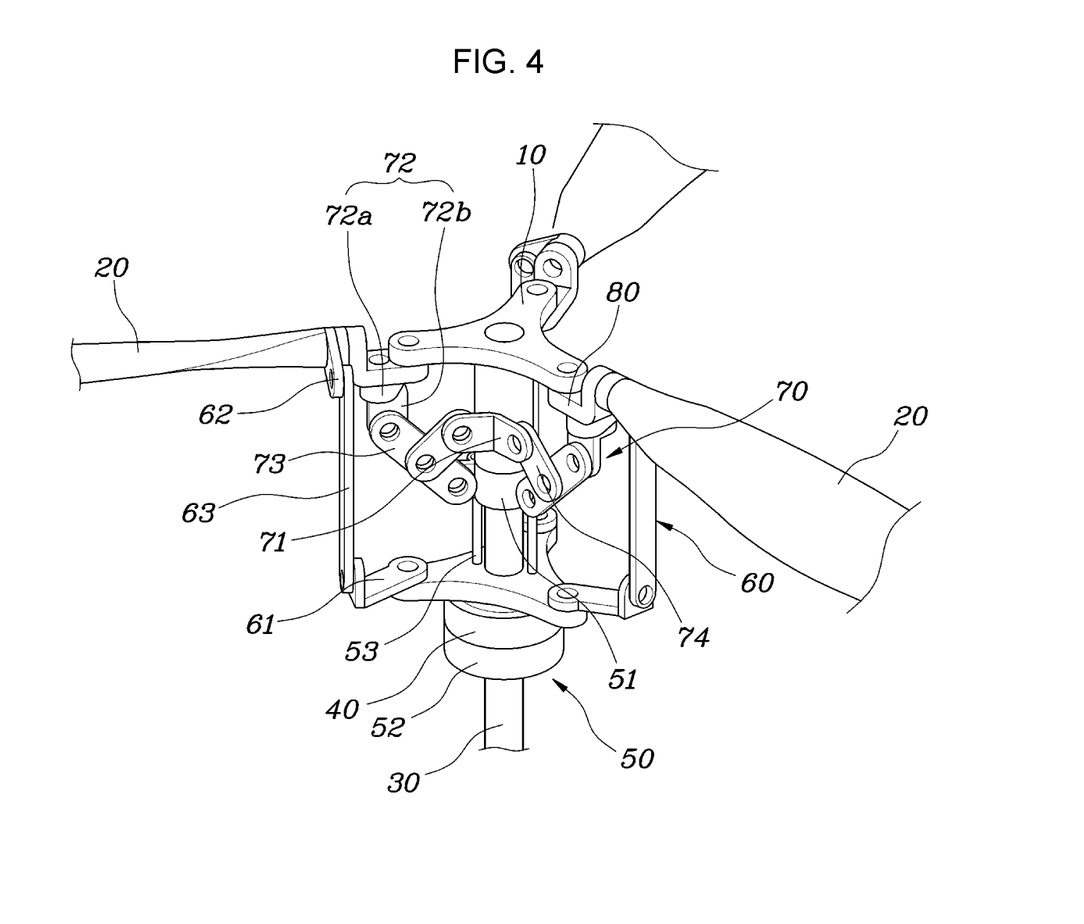
Figure 5:
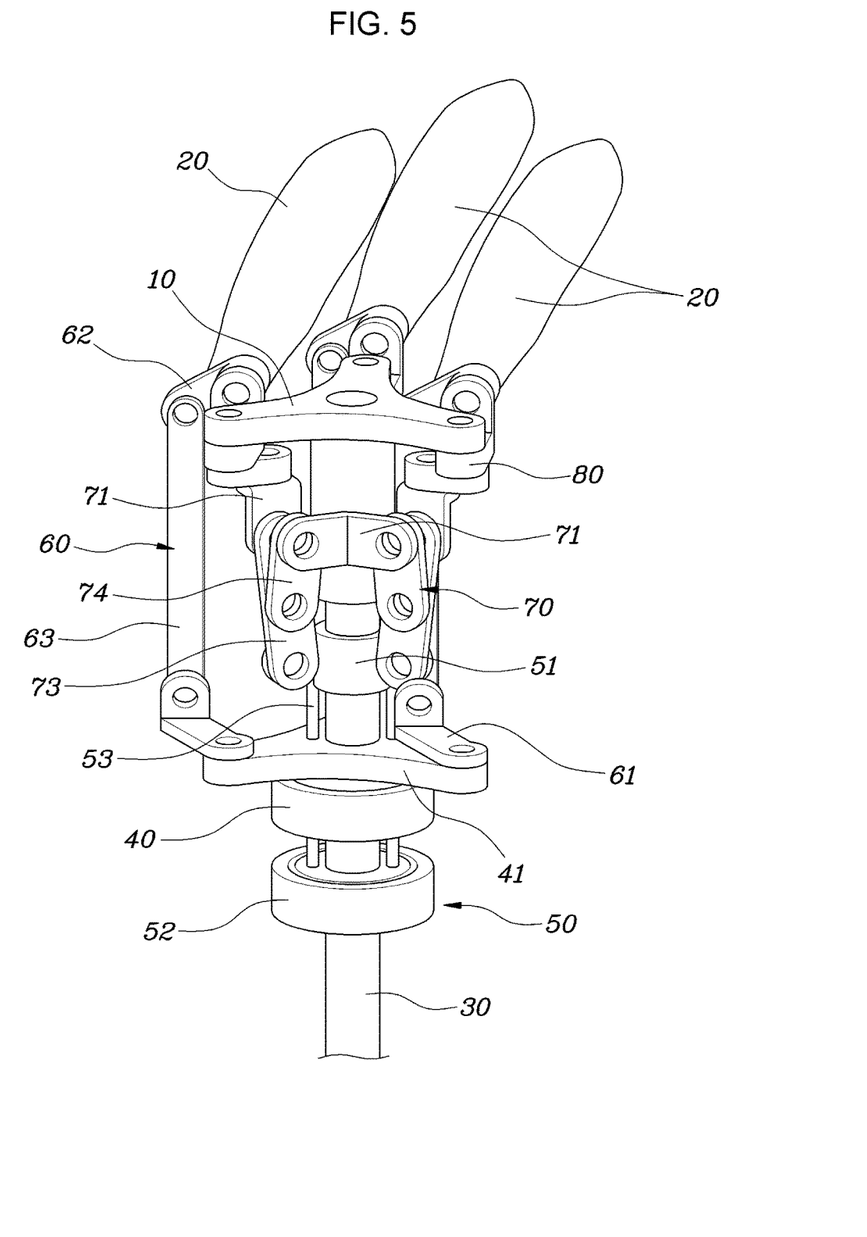
FIG. 5 is a view showing a folding or unfolding motion of the wings.
Figure 6:
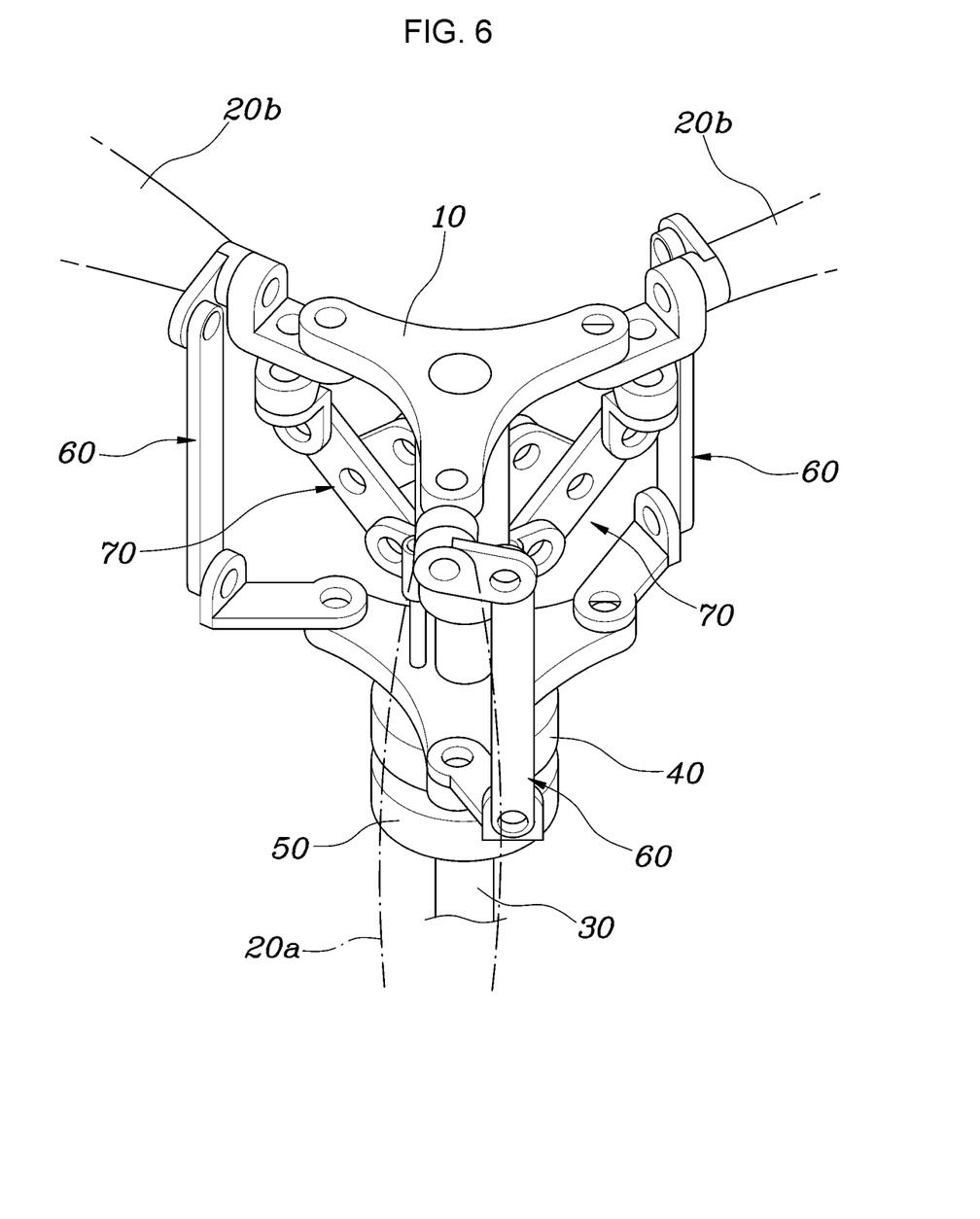
FIG. 6 is a view showing the propeller apparatus of the air mobility shown in FIG. 1.

FIG. 1 is a view showing a propeller apparatus of an air mobility according to various exemplary embodiments of the present invention. FIG. 2 is a view showing the propeller apparatus of the air mobility shown in FIG. 1. FIG. 3 and FIG. 4 are views showing a pitching motion of wings. FIG. 5 is a view showing a folding or unfolding motion of the wings. FIG. 6 is a view showing the propeller apparatus of the air mobility shown in FIG. 1.

As shown in FIG. 1 and FIG. 2, the propeller apparatus of the air mobility according to various exemplary embodiments of the present invention may include a main rotor 10 and a plurality of blades 20 connected to the main rotor 10; a rotation shaft 30 configured to transmit a rotational force of the rotation shaft to the main rotor 10 to rotate the main rotor 10 and the plurality of blades 20; a first movable portion 40 and a second movable portion 50 configured to independently perform vertical motion around the rotation shaft 30; a first link assembly 60 connecting the first movable portion 40 to the plurality of blades 20 so that, during the vertical motion of the first movable portion 40, the plurality of blades 20 is rotated on the spot to perform a pitching motion of the plurality of blades; and a second link assembly 70 connecting the second movable portion 50 to the plurality of blades 20 so that, during the vertical motion of the second movable portion 50, the plurality of blades 20 is rotated and moved to perform a folding or unfolding motion of the plurality of blades.

The propeller apparatus of the present invention may be provided to a fuselage or a wing of the air mobility. The rotation shaft 30 is connected to a driving motor M, and the plurality of blades 20 are rotated with the rotation shaft 30 and the main rotor 10 by a rotational force transmitted from the driving motor M. Therefore, thrust is generated so that the air mobility may fly. Furthermore, components of the present invention may be provided to be inverted vertically.

Whereby, the rotation shaft 30 is connected to the driving motor M and is rotated by receiving a rotational force from the driving motor M. The main rotor 10 connected to the rotation shaft 30 and the plurality of blades 20 connected to the main rotor 10 are rotated with the rotation shaft 30.

The first movable portion 40 and the second movable portion 50 that independently perform vertical motion are provided around the rotation shaft 30. The first movable portion 40 and the second movable portion 50 are respectively connected to the plurality of blades 20 through the first link assembly 60 and the second link assembly 70. In other words, when the first movable portion 40 is moved in a vertical direction thereof, the plurality of blades 20 are rotated on the spot by the first link assembly 60 to perform a pitching motion thereof, so that attitude control of the air mobility may be performed. When the second movable portion 50 is moved in the vertical direction thereof, the plurality of blades 20 are rotated and moved by the second link assembly 70 to perform a folding or unfolding motion of the plurality of blades, so that the plurality of blades 20 may be folded or unfolded on the air mobility.

The first movable portion 40 and the second movable portion 50 may be respectively operated by a rotation or linear actuator, and may be moved in the vertical direction while being connected to separate control rods.

In detail, according to various exemplary embodiments of the present invention, each of the plurality of blades 20 is rotatably connected to the main rotor 10 through a connecting portion 80, and the first link assembly 60 and the second link assembly 70 may be rotatably connected to the connecting portion 80 at different locations.

As shown in FIG. 2, the connecting portion 80 is rotatably provided to the main rotor 10, the blade 20 is rotatably connected to the connecting portion 80. Furthermore, the first link assembly 60 and the second link assembly 70 are rotatably connected to the connecting portion 80 at different locations. Accordingly, the blade 20 is provided to the main rotor 10 through the connecting portion 80, and the blade 20 is rotated on the spot by the first link assembly 60 during the vertical motion of the first movable portion 40, or the second link assembly 70 directly rotates the connecting portion 80 so that the plurality of blades 20 are rotated and moved during the vertical motion of the second movable portion 50.

Therefore, the connecting portion 80 may be formed in a vertically bent shape so that the first link assembly 60 and the second link assembly 70 are connected to the connecting portion 80 at different locations. The blade 20 is connected to a vertical portion 81 of the connecting portion 80 together with the first link assembly 60 to be rotatable about a horizontal shaft of the blade. The blade 20 is provided to the main rotor 10 to be rotatable about a vertical shaft of the main rotor 10 through a horizontal portion 82 and the second link assembly 70 is connected to the main rotor 10 to be rotatable about the vertical shaft thereof.

As described above, the plurality of blades 20, the first link assembly 60, and the second link assembly 70 are connected to each other through the connecting portion 80 provided to the main rotor 10, so that attitude and location control of the plurality of blades 20 in a response to the vertical motions of the first movable portion 40 and the second movable portion 50 may be performed.

Hereinbelow, each configuration will be described in detail in a response to attitude control and rotating location control of the plurality of blades 20.

The first link assembly 60 for attitude control of the plurality of blades 20 includes: a first connecting link 61 rotatably connected to the first movable portion 40; a second connecting link 62 coupled to the blade 20 and rotatably connected to the connecting portion 80; and a third connecting link 63 rotatably connected to the first connecting link 61 and the second connecting link 62.

As shown in FIG. 2, the first link assembly 60 is configured such that the first connecting link 61, the second connecting link 62, and the third connecting link 63 are rotatably connected to each other, whereby, as the blade 20 is rotated on the spot at the connecting portion 80 during vertical motion of the first movable portion 40, a pitching motion of the blade is performed.

Therefore, the first connecting link 61 may be provided to the first movable portion 40 to be rotatable about a vertical shaft thereof. The second connecting link 62 may be connected to the connecting portion 80 to be rotatable about a horizontal shaft thereof. The third connecting link 63 may be connected to the first connecting link 61 and the second connecting link 62 to be rotatable about a horizontal shaft thereof. In various exemplary embodiments of the present invention, connection of each of the links may be rotatable by a hinge structure. Therefore, as a rotatable direction for each of the first connecting link 61, the second connecting link 62, and the third connecting link 63 is set, during vertical motion of the first movable portion 40, the first connecting link 61, the second connecting link 62, and the third connecting link 63 are operated in conjunction with each other to be moved vertically, so that a pitching motion of the blade 20 may be performed.

When the first movable portion 40 is moved vertically, the first connecting link 61 and the third connecting link 63 are moved vertically together with the first movable portion 40 to rotate the second connecting link 62. Whereby, the blade 20 connected to the second connecting link 62 is rotated on the connecting portion 80 to change pitch of the blade 20. A vertical location of the first movable portion 40 is determined by attitude control of the blade 20, and may be controlled by a separate controller.

As shown in FIG. 3, when the first movable portion 40 is moved upward, the third connecting link 63 is moved upward together with the first connecting link 61 connected to the first movable portion 40. Therefore, as the second connecting link 62 connected to the third connecting link 63 is rotated on the connecting portion 80, the blade 20 coupled to the connecting portion 80 is rotated toward the upper side thereof.

Conversely, as shown in FIG. 4, when the first movable portion 40 is moved downward, the third connecting link 63 is moved downwards together with the first connecting link 61 connected to the first movable portion 40. Therefore, as the second connecting link 62 connected to the third connecting link 63 is rotated on the connecting portion 80, the blade 20 coupled to the connecting portion 80 is rotated toward the lower side thereof.

Accordingly, the propeller apparatus of the present invention may control pitch of the blade 20 by vertical motion of the first movable portion 40.

The second link assembly 70 provided for rotating location control of the plurality of blades 20 includes: a fixed link 71 provided on the rotation shaft 30; a first rotating link 72 rotatably connected to the connecting portion 80; a second rotating link 73 rotatably connected to the second movable portion 50 and the first rotating link 72; and a third rotating link 74 rotatably connected to the fixed link 71 and the second rotating link 73.

As shown in FIG. 2, the second link assembly 70 is configured such that the fixed link 71, the first rotating link 72, the second rotating link 73, and the third rotating link 74 are rotatably connected to each other. Thereby, when the second movable portion 50 is moved vertically, the connecting portion 80 is rotated around the main rotor 10, and thus the blade 20 is rotated and moved together with the connecting portion 80 to perform folding of unfolding motion thereof.

The fixed link 71, the second rotating link 73, and the third rotating link 74 are coupled to each other to be rotatable about horizontal shafts thereof, and the first rotating link 72 is connected to the connecting portion 80 to be rotatable about a vertical shaft thereof, and the second rotating link 73 is connected to the connecting portion 80 to be rotatable about the horizontal shaft thereof. The first rotating link 72 may include: a first additional link 72a connected to the connecting portion 80 to be rotatable about a vertical shaft thereof; and a second additional link 72b connected at a first end portion thereof to the first additional link 72a to be rotatable about a vertical shaft thereof and connected at a second end portion thereof to the second rotating link 73 to be rotatable about a horizontal shaft thereof. Accordingly, the first additional link 72a may be formed to extend by a predetermined length, and the second additional link 72b may be formed to be bent perpendicularly. Thereby, when the second rotating link 73 is rotated during vertical motion of the second movable portion 50, the second additional link 72b of the first rotating link 72 is moved in conjunction with the second rotating link 73 to be moved in a direction away from or close to the rotation shaft 30. At the same time, the first additional link 72a may be rotated due to movement of the second additional link 72b while being connected to the connecting portion 80, and the connecting portion 80 may be rotated due to rotation of the first additional link 72a, so that rotating location of the blade 20 may be changed.

The fixed link 71 may be located above the second movable portion 50, and the second movable portion 50 may be moved vertically at a location below the fixed link 71. The second rotating link 73 may extend longer than the third rotating link 74. Whereby, when the second movable portion 50 is moved vertically, the second rotating link 73 may be operated in a folding or unfolding form while being supported by the third rotating link 74.

As described above, when the second movable portion 50 is moved vertically, the second rotating link 73 is rotated to be folded or unfolded to the rotation shaft 30 while being supported by the third rotating link 74, so that a rotating location of the blade 20 is changed while the connecting portion 80 connected to the first rotating link 72 is rotated around the main rotor 10. At the instant time, a vertical location of the second movable portion 50 may be determined by the rotating location of the blade 20, and the location thereof may be controlled by a separate controller.

As shown in FIG. 3, when the second movable portion 50 is moved upward, the second rotating link 73 connected to the second movable portion 50 is supported by the third rotating link 74, so that the second rotating link 73 is rotated clockwise and the third rotating link 74 is rotated counterclockwise. The second rotating link 73 performs unfolding motion, and the first rotating link 72 connected to the second rotating link 73 rotates the connecting portion 80 provided on the main rotor 10. Therefore, the blade 20 coupled to the connecting portion 80 may be rotated and moved in an unfolded direction thereof.

Conversely, as shown in FIG. 5, when the second movable portion 50 is moved downward, the second rotating link 73 connected to the second movable portion 50 is supported by the third rotating link 74, so that the second rotating link 73 is rotated counterclockwise and the third rotating link 74 is rotated clockwise. Whereby, the second rotating link 73 performs folding motion, and the first rotating link 72 connected to the second rotating link 73 rotates the connecting portion 80 provided on the main rotor 10. Therefore, the blade 20 coupled to the connecting portion 80 is rotated and moved in a folded direction thereof.

Meanwhile, the first movable portion 40 may include an auxiliary rotor 41 formed in the same shape as the main rotor 10, the first link assembly 60 may be connected to the main rotor 10 and the auxiliary rotor 41. As described above, as the first movable portion 40 has the auxiliary rotor 41 of the same shape as the main rotor 10, the first link assembly 60 may be stably provided in the vertical direction with respect to the plurality of blades 20 disposed along a circumference of the main rotor 10.

The second movable portion 50 includes an upper slider 51 and a lower slider 52 moved vertically together around the rotation shaft 30. The upper slider 51 and the lower slider 52 may be spaced from each other at an upper side and a lower side of the first movable portion 40, and the upper slider 51 and the lower slider 52 may be connected to each other through a connecting shaft 53 slidably passing through the first movable portion 40.

In an exemplary embodiment of the present invention, the connecting shaft 53 is installed to slidably pass through the first movable portion 40 and the auxiliary rotor 41.

The second link assembly 70 may be rotatably connected to the upper slider 51 and the blade 20. In other words, the second movable portion 50 includes the lower slider 52 moved vertically by a rotary or linear actuator, and the upper slider 51 coupled to the lower slider 52 through the connecting shaft 53 to be moved together with the lower slider 52 and to which the second link assembly 70 is connected. Accordingly, as the second movable portion 50 includes the upper slider 51 and the lower slider 52, interference between the second link assembly 70 and other components may be minimized.

Furthermore, as the lower slider 52 and the upper slider 51 may be connected to each other through the connecting shaft 53 passing through the first movable portion 40, a volume of package may be reduced.

Meanwhile, a blade 20a of the plurality of blades 20 may be connected to the first movable portion 40 through the first link assembly 60, and the rest 20b of the plurality of blades 20 may be connected to the first movable portion 40 and the second movable portion 50 through the first link assembly 60 and the second link assembly 70.

Therefore, all the plurality of blades 20 are connected to the first movable portion 40 through the first link assembly 60 so that all the plurality of blades 20 may perform a pitching motion. Except for one blade 20a, the second movable portion 50 is connected to the other blades 20b through the second link assembly 70, so that the other blades 20b are rotated and moved toward the fixed blade 20a, performing a folding or unfolding motion of the plurality of blades. As an example, as shown in FIG. 6, one blade 20a of the three blades 20 is connected to the first movable portion 40 through the first link assembly 60, performing only a pitching motion. The other blades 20b are connected to the first movable portion 40 and the second movable portion 50 through the first link assembly 60 and the second link assembly 70, performing a folding or unfolding motion in a response to the rotating location change in addition to the pitching motion.

The propeller apparatus of the air mobility having the structure described above controls the plurality of blades thereof to be unfolded or folded in a response to flight situation of the air mobility. Accordingly, energy efficiency of the air mobility may be improved and flight distance may be increased by efficient use of the plurality of blades in each flight situation. Furthermore, as a pitching motion of the plurality of blades is performed in addition to a folding or unfolding motion of the plurality of blades, flight performance may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A propeller apparatus of an air mobility, the propeller apparatus comprising:
   a main rotor and a plurality of blades rotatably connected to the main rotor;
   a rotation shaft fixedly connected to the main rotor and configured to transmit a rotational force of the rotation shaft to the main rotor to rotate the main rotor and the plurality of blades;
   a first movable portion and a second movable portion that are slidably coupled to the rotation shaft and configured to independently perform vertical motion around the rotation shaft;
   a first link assembly coupling the first movable portion to the plurality of blades so that, during the vertical motion of the first movable portion, the plurality of blades is rotated to perform a pitching motion of the plurality of blades; and
   a second link assembly coupling the second movable portion to the plurality of blades so that, during the vertical motion of the second movable portion, the plurality of blades is rotated and moved to perform a folding or unfolding motion of the plurality of blades,
   wherein one of the plurality of blades is connected to the first movable portion through the first link assembly, and a rest of the plurality of blades are connected to the first movable portion and the second movable portion through the first link assembly and the second link assembly.

2. The propeller apparatus of claim 1,
   wherein each of the plurality of blades is rotatably connected to the main rotor through a connecting portion, and
   wherein the first link assembly and the second link assembly are rotatably connected to the connecting portion at different locations.

3. The propeller apparatus of claim 2, wherein the connecting portion is coupled to each of the plurality of blades and is provided to be rotatable about a vertical shaft of the main rotor.

4. The propeller apparatus of claim 2, wherein the first link assembly includes:
   a first connecting link rotatably connected to the first movable portion;
   a second connecting link coupled to a corresponding blade among the plurality of blades and rotatably connected to the connecting portion; and
   a third connecting link rotatably connected to the first connecting link and the second connecting link.

5. The propeller apparatus of claim 4,
   wherein the first connecting link is rotatable about a vertical shaft thereof,
   wherein the second connecting link is connected to the connecting portion to be rotatable about a horizontal shaft thereof, and
   wherein the third connecting link is connected to the first connecting link and the second connecting link to be rotatable about a horizontal shaft thereof.

6. The propeller apparatus of claim 4, wherein, when the first movable portion is moved vertically along the rotation shaft, the first connecting link and the third connecting link are moved vertically together with the first movable portion to rotate the second connecting link with respect to the connecting portion, so that the corresponding blade connected to the second connecting link is rotated on the connecting portion, changing pitch of the corresponding blade.

7. The propeller apparatus of claim 2, wherein the second link assembly includes:
   a fixed link fixedly provided on the rotation shaft;
   a first rotating link rotatably connected to the connecting portion;
   a second rotating link rotatably connected to the second movable portion and the first rotating link; and
   a third rotating link rotatably connected to the fixed link and the second rotating link.

8. The propeller apparatus of claim 7, wherein the first rotating link includes:
   a first additional link connected to the connecting portion to be rotatable about a vertical shaft thereof; and
   a second additional link connected at a first end portion thereof to the first additional link to be rotatable about a vertical shaft thereof and connected at a second end portion thereof to the second rotating link to be rotatable about a horizontal shaft thereof.

9. The propeller apparatus of claim 7, wherein the fixed link is located above the second movable portion and the second movable portion is configured to be moved perpendicularly at a location below the fixed link.

10. The propeller apparatus of claim 7, wherein the second rotating link extends longer than the third rotating link.

11. The propeller apparatus of claim 7, wherein, when the second movable portion is moved vertically and the second rotating link is rotated to be folded or unfolded to the rotation shaft while being supported by the third rotating link, the connecting portion connected to the main rotor is rotated and a location of the plurality of blades is changed.

12. The propeller apparatus of claim 1,
   wherein the first movable portion includes an auxiliary rotor formed in a same shape as the main rotor, and
   wherein the first link assembly is coupled to the main rotor and the auxiliary rotor.

13. The propeller apparatus of claim 1,
   wherein the second movable portion includes an upper slider and a lower slider moving vertically together around the rotation shaft, and
   wherein the upper slider and the lower slider are spaced from each other at an upper side and a lower side of the first movable portion, and the upper slider and the lower slider are connected to each other by a connecting shaft slidably passing through the first movable portion.

14. The propeller apparatus of claim 13,
   wherein the first movable portion includes an auxiliary rotor formed in a same shape as the main rotor,
   wherein the first link assembly is coupled to the main rotor and the auxiliary rotor, and
   wherein the upper slider and the lower slider are connected to each other by the connecting shaft slidably passing through the auxiliary rotor and the first movable portion.

15. The propeller apparatus of claim 13, wherein the second link assembly is rotatably connected to the upper slider and the plurality of blades.

16. The propeller apparatus of claim 15, wherein the second link assembly includes:
- a fixed link fixedly provided on the rotation shaft;
- a first rotating link rotatably connected to the connecting portion;
- a second rotating link rotatably connected to the upper slider of the second movable portion and the first rotating link; and
- a third rotating link rotatably connected to the fixed link and the second rotating link.

* * * * *